United States Patent
Atsuta

[11] Patent Number: 6,107,720
[45] Date of Patent: Aug. 22, 2000

[54] CONTROL APPARATUS FOR VIBRATION MOTOR

[75] Inventor: Akio Atsuta, Yokosuka, Japan

[73] Assignee: Canon Kabushiki Kaisha, Tokyo, Japan

[21] Appl. No.: 09/179,580

[22] Filed: Oct. 27, 1998

[30] Foreign Application Priority Data

Oct. 29, 1997 [JP] Japan .................................. 9-297379

[51] Int. Cl.⁷ ................................................ H02N 2/00
[52] U.S. Cl. ...................................................... 310/316.01
[58] Field of Search .............................. 310/316.01, 317

[56] References Cited

U.S. PATENT DOCUMENTS

| | | | |
|---|---|---|---|
| 4,954,741 | 9/1990 | Furutsu et al. ................... | 310/316.01 |
| 5,134,333 | 7/1992 | Atsuta ................................ | 310/323 |
| 5,231,325 | 7/1993 | Tamai et al. ....................... | 310/323 |
| 5,247,221 | 9/1993 | Atsuta ................................ | 310/323 |
| 5,298,829 | 3/1994 | Tsukimoto ......................... | 310/323 |
| 5,300,850 | 4/1994 | Okumura ........................... | 310/323 |
| 5,612,598 | 3/1997 | Fukui et al. ....................... | 318/116 |
| 5,656,881 | 8/1997 | Atsuta ................................ | 310/316 |
| 5,739,621 | 4/1998 | Atsuta et al. ...................... | 310/316 |

*Primary Examiner*—Thomas M. Dougherty
*Attorney, Agent, or Firm*—Fitzpatrick, Cella, Harper & Scinto

[57] ABSTRACT

This invention relates to a control apparatus for a vibration motor and, more particularly, to an apparatus capable of driving the vibration motor at high speed. This invention provides an apparatus capable of driving the motor at high speed by setting, as a driving start frequency of the motor, a frequency slightly higher than the boundary between the hysteresis and non-hysteresis ranges of the vibration motor.

15 Claims, 10 Drawing Sheets

CONTROL APPARATUS FOR VIBRATION MOTOR

BACKGROUND OF THE INVENTION

1. Field of the Invention

The present invention relates to a vibration motor for moving a vibration member and a contact member relative to each other with a frictional force, the vibration member being adapted to generate a vibration wave in an elastic member by applying an alternating signal from a driving circuit to a piezoelectric member serving as an electro-mechanical energy conversion element, and the contact member being in pressure contact with the vibration member, a vibration driving apparatus or vibration motor apparatus having the vibration motor and, more particularly, to a driving start system.

2. Related Background Art

Figure 10:
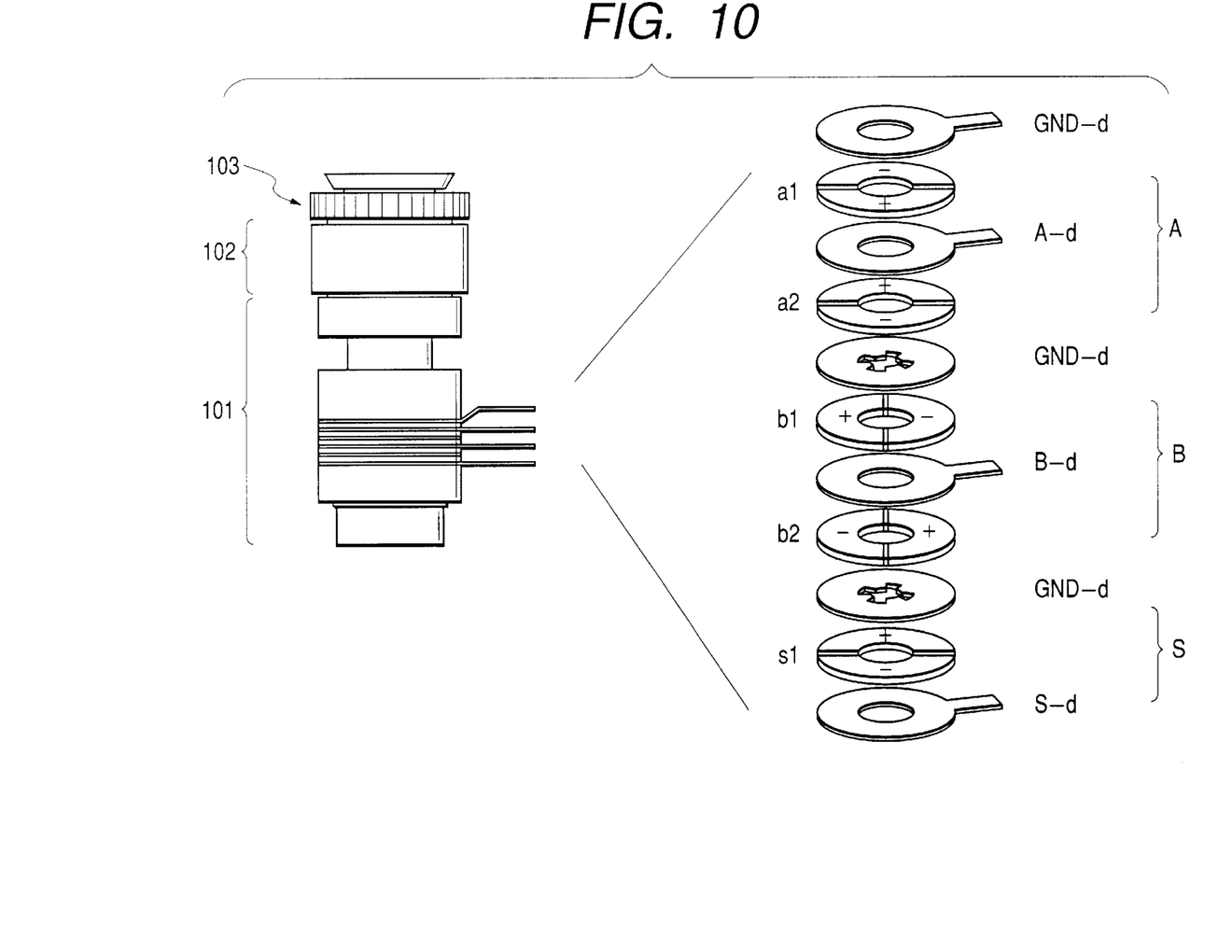
FIG. 10 shows a side view of a vibration motor and an exploded perspective view of piezoelectric elements.

There have been proposed a variety of vibration motors each for moving relative to each other, with a frictional force, a vibration member for generating a vibration wave in an elastic member and a contact member in pressure contact with the vibration member or vibration driving apparatuses such as an apparatus having a vibration motor. FIG. 10 shows a conventional rod type vibration motor.

FIG. 10 is a view showing the side surface of the rod type vibration motor, and the layout of voltage supply and output voltage extraction of voltage elements of a piezoelectric element constituting the rod type vibration motor. The rod type vibration motor has a vibration member 101 in which the piezoelectric element is sandwiched between rod like elastic members. A rotor 102 serving as a contact member is placed in pressure contact with the distal end portion of one elastic member by a pressure means (not shown). The rotor 102 rotates together with an output gear 103 so that a motor output can be extracted externally.

Each of the piezoelectric elements (a1, a2, b1, b2, and s1) is obtained by dividing one piezoelectric element plate into halves, which have different polarities. Semicircular electrode films are formed on the respective divided portions on the upper surface of the piezoelectric element, and an electrode film is formed on the entire lower surface of the piezoelectric element. An A phase piezoelectric element portion A for driving is composed of the piezoelectric elements a1 and a2 having opposite polarities through an electrode plate A-d. A B phase piezoelectric element portion B is composed of the piezoelectric elements b1 and b2 having opposite polarities through an electrode plate B-d.

An alternating signal is applied between a ground electrode plate GND-d and the electrode plate A-d of the A phase piezoelectric element portion A to excite lateral (bending) vibration within the plane formed by the axial direction of the vibration member and an axial direction crossing the polarized areas of the piezoelectric element plate. Similarly, an alternating signal is applied between an electrode plate GND-d and the electrode plate B-d of the B phase piezoelectric element portion B to excite lateral (bending) vibration within the plane formed by the axial direction of the vibration member and an axial direction crossing the polarized areas of the piezoelectric element plate. The A phase piezoelectric element portion A and the B phase piezoelectric element portion B have a phase difference of 90°. When the bending vibrations of these portions are synthesized, surface particles on the driving surface move elliptically.

A vibration detection piezoelectric element S1 is disposed in the same phase with the piezoelectric element a2 in this vibration member. An insulating sheet (not shown) is arranged between a metal block forming one elastic member and the signal extraction electrode plate S-d contacting entirely the electrode of the vibration detection piezoelectric element S1, thereby being insulated from the GND potential. An output voltage corresponding to the vibration of the vibration detection piezoelectric element S1 can be directly output from the element S1. This output voltage is used to obtain a resonant frequency in accordance with its magnitude or phase difference from the driving voltage.

Figure 11:
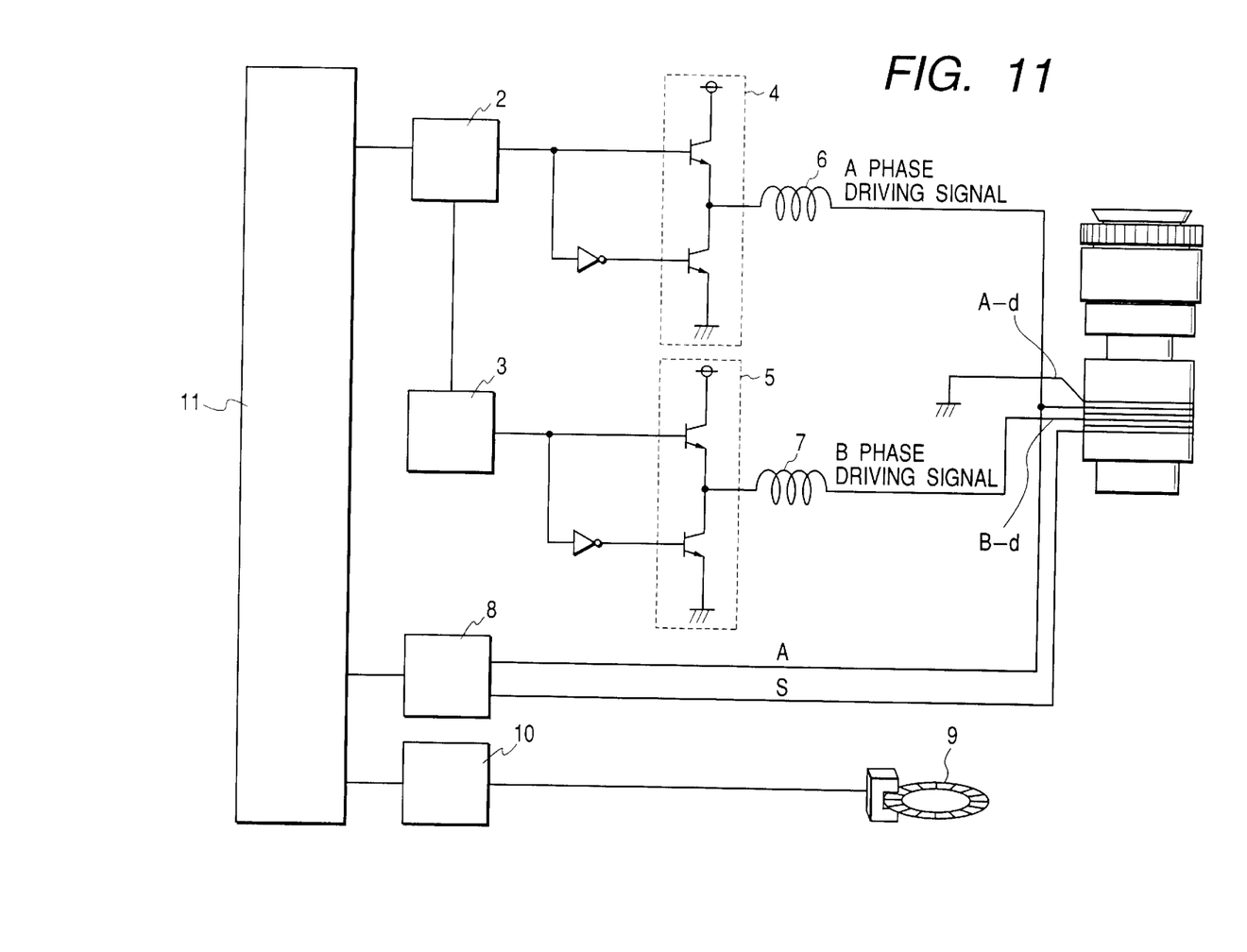
FIG. 11 is a diagram showing a conventional driving circuit.

FIG. 11 shows a driving circuit for this vibration motor. A and B phase driving signals are applied to the electrode plates A-d and B-d of the A and B phase piezoelectric element portions A and B, respectively. A control circuit (to be referred to as a control microcomputer hereinafter) 11 drives and controls the motor. An oscillator 2 comprises a VCO (Voltage-Controlled Oscillator) for generating an alternating signal. A 90° phase shifter 3 is connected to the oscillator 2. Switching circuits 4 and 5 switch the power supply voltage in accordance with the alternating signal from the oscillator 2 and the phase shifter 3. Inductance elements 6 and 7 are for impedance matching with the motor.

A phase difference detector 8 detects a signal phase difference θ(A–S) between the A phase driving signal and a vibration detection signal S. A speed detector 9 connected to the motor is an encoder or the like for detecting rotation of the motor and detecting the motor speed. The detection information is converted into a speed signal by a speed detection circuit 10, and the speed signal is input to the control microcomputer 11.

Figure 12:
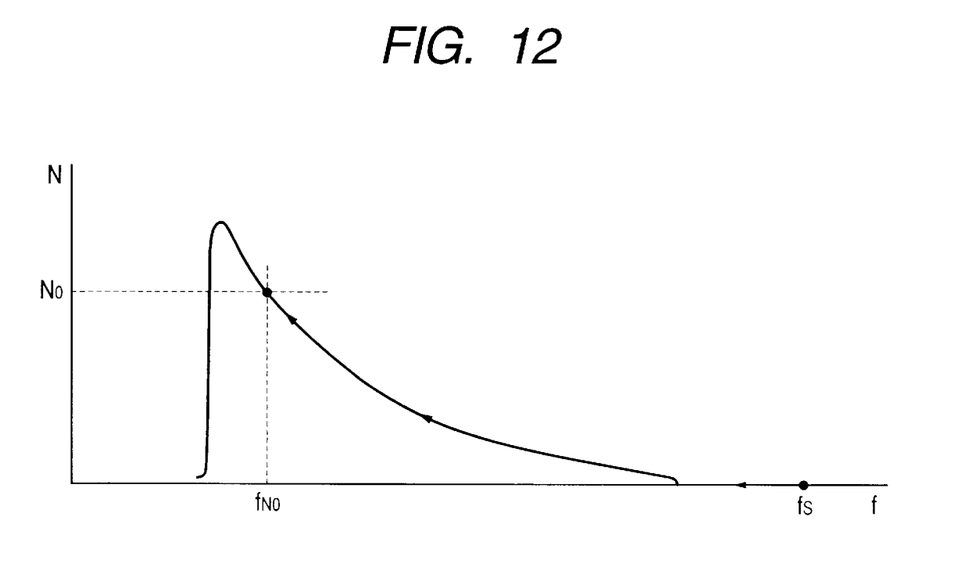
FIG. 12 is a graph showing the characteristics between the frequency and rotation number of the vibration motor.

FIG. 12 shows the characteristics between the frequency and rotation number (speed) of the vibration motor. For normally starting a driving operating of the vibration motor, the frequency is gradually reduced from the higher side ($f_s$) to reach a frequency $f_{N0}$ serving as a target rotation number $N_0$ so as to drive the motor more smoothly.

In this driving circuit, however, the conventional driving start method takes a long time until the motor rotation reaches a steady rotation number, and cannot obtain a short rise time.

Even if a frequency corresponding to a given rotation number is abruptly applied to the vibration motor, no quick driving start is attained because the vibration motor has hysteresis characteristics. The hysteresis characteristics are defined as a frequency area in which the motor can be started when the frequency is reduced from the higher frequency side but in which the motor cannot immediately be started when the frequency is increased from the lower frequency side.

SUMMARY OF THE INVENTION

The present invention has been made in consideration of the above situation, and has as its object to provide an apparatus for starting a driving operation of a vibration motor at high speed.

According to one aspect of the present invention, on the basis of the above object, there is provided a driving apparatus for a vibration motor, and which causes the vibration motor to generate a driving force by applying a periodic signal to an electro-mechanical energy conversion element of the vibration motor, comprising a driving circuit for applying a periodic signal to the electro-mechanical energy conversion element, and a setting circuit for setting, as an initial frequency of the periodic signal to be applied to the electro-mechanical energy conversion element when a driving operation of the vibration motor is started, a frequency corresponding to a boundary frequency at which the vibration motor starts to generate a driving force when the driving circuit changes the frequency of the periodic signal from a frequency lower than a resonant frequency to a frequency higher than the resonant frequency.

According to another aspect of the present invention, on the basis of the above object, there is provided a driving apparatus for a vibration motor, and which causes the vibration motor to generate a driving force by applying a periodic signal to an electro-mechanical energy conversion element of the vibration motor, comprising a driving circuit for applying a periodic signal to the electro-mechanical energy conversion element, and a control circuit for detecting a frequency corresponding to a boundary frequency at which the vibration motor starts to generate a driving force when the frequency of the periodic signal changes from a frequency lower than a resonant frequency to a frequency higher than the resonant frequency, and for setting a frequency detected by said control circuit as a frequency of the periodic signal for driving the vibration motor.

According to still another aspect of the present invention, on the basis of the above object, there is provided a driving apparatus for a vibration motor, and which causes the vibration motor to generate a driving force by applying a periodic signal to an electro-mechanical energy conversion element of the vibration motor, comprising a driving circuit for applying the periodic signal to the electro-mechanical energy conversion element, and a frequency control circuit for controlling the driving circuit so as to form a periodic signal having a frequency at which the periodic signal is higher than a frequency that will drive the vibration motor, and for jumping the frequency of the periodic signal applied to the electro-mechanical energy conversion element from the frequency to a frequency corresponding to a boundary frequency at which the vibration motor starts to generate a driving force when the frequency of the periodic signal applied to the electro-mechanical energy conversion element changes from a frequency lower than a resonant frequency to a frequency higher than the resonant frequency.

According to still another aspect of the present invention, on the basis of the above object, there is provided a driving apparatus for a vibration motor, and which causes the vibration motor to generate a driving force by applying a periodic signal to an electro-mechanical energy conversion element of the vibration motor, comprising a driving circuit for applying a periodic signal to the electro-mechanical energy conversion element, detection means for detecting a driving state of the vibration motor when the motor is driven by the driving circuit applying a periodic signal having a predetermined frequency, calculation means for calculating, on the basis of the detected driving state, a frequency corresponding to a boundary frequency at which the vibration motor starts to generate a driving force during a time in which a frequency of the periodic signal changes from a frequency lower than a resonant frequency to a frequency higher than the resonant frequency, and a control circuit for jumping the frequency of the periodic signal from the predetermined frequency to the frequency calculated by the calculation means.

According to still another aspect of the present invention, on the basis of the above object, there is provided a driving apparatus for a vibration motor which causes the vibration motor to generate a driving force by applying a periodic signal to an electro-mechanical energy conversion element of the vibration motor, comprising a driving circuit for applying a periodic signal to the electro-mechanical energy conversion element, a setting circuit for setting, as an initial frequency, a frequency higher than a boundary frequency at which the vibration motor starts to generate a driving force during a time in which frequency of the periodic signal applied to the electro-mechanical energy conversion element is changed from a frequency lower than a resonant frequency to a frequency higher than the resonant frequency, and a control circuit for controlling the driving circuit so as to change the frequency of the periodic signal applied to the electro-mechanical energy conversion element from the initial frequency set by the setting circuit to a frequency corresponding to the boundary frequency.

The above and other objects, features, and advantages of the present invention will be apparent from the detailed description of the preferred embodiments in conjunction with the accompanying drawings.

DETAILED DESCRIPTION OF THE PREFERRED EMBODIMENTS (First Embodiment)

Figure 1:
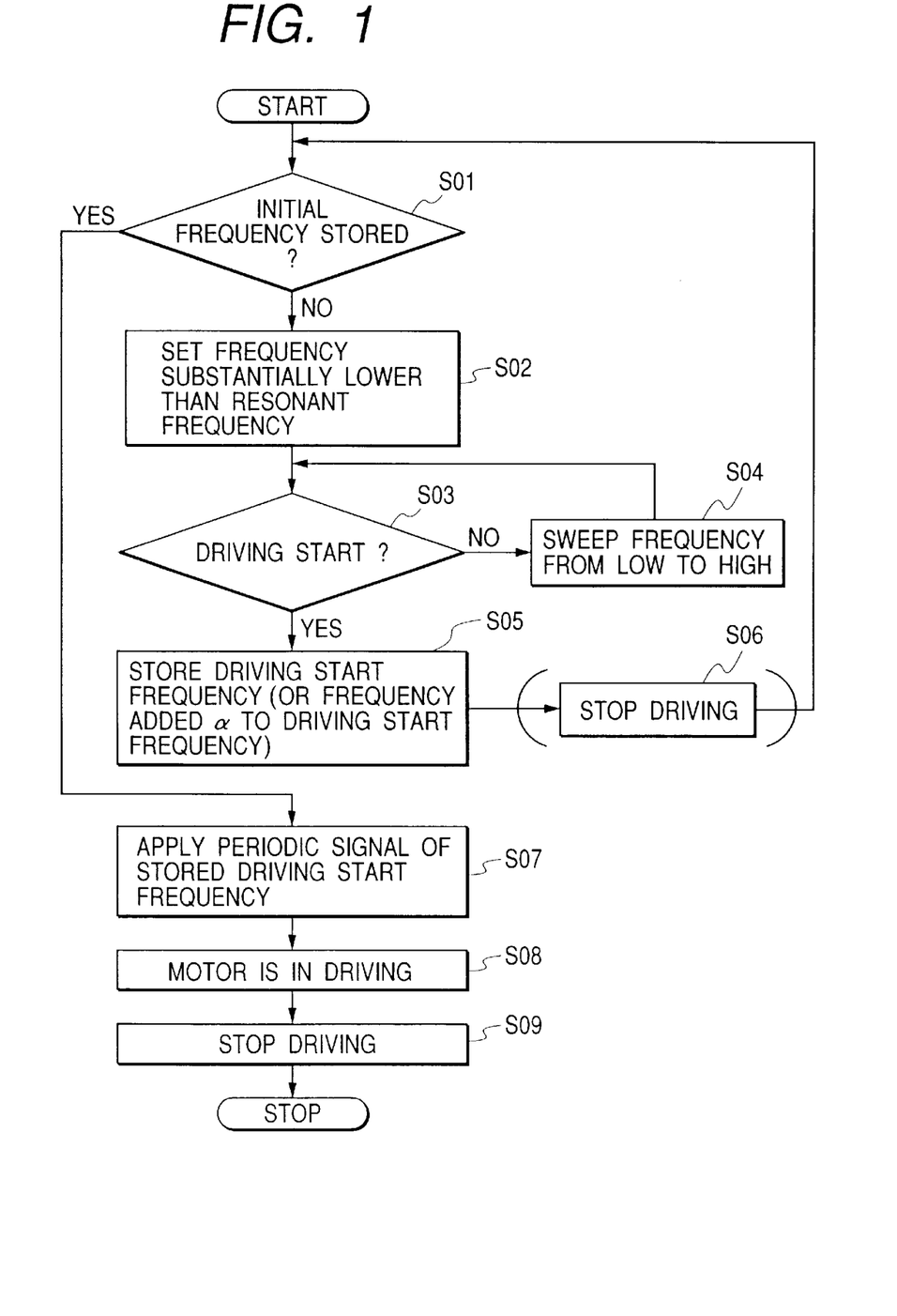
FIG. 1 is a flow chart showing the operation of the first embodiment of the present invention.
Figure 2:
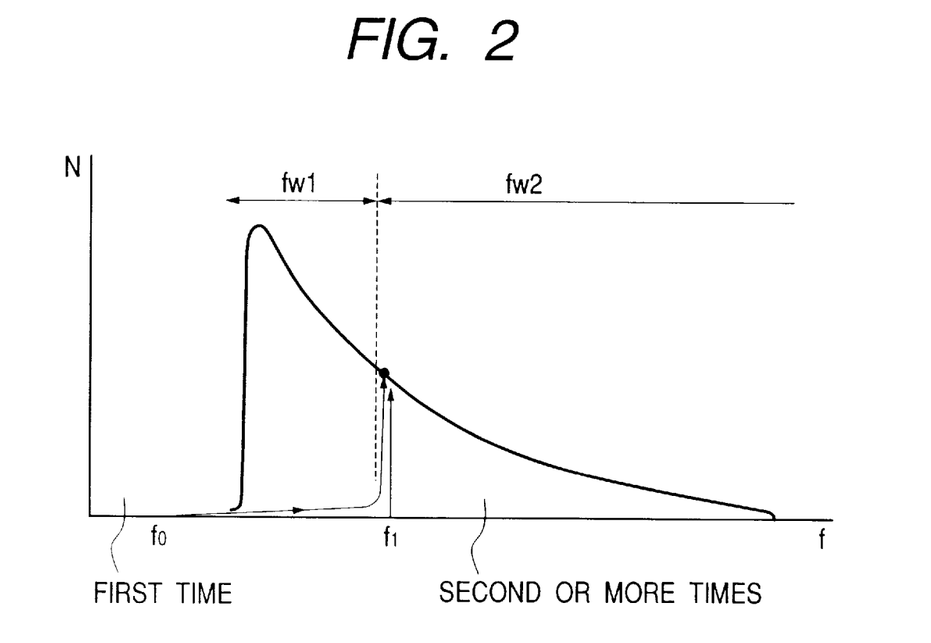
FIG. 2 is a graph showing the characteristics of a driving algorithm shown in FIG. 1 and representing the relationship between the frequency and rotation number including hysteresis characteristics.

FIGS. 1 and 2 show the first embodiment of the present invention.

A vibration motor in a vibration driving apparatus of this embodiment is not limited to a specific one. For example, the vibration motor comprises a rod type vibration motor shown in FIG. 10, and a vibration motor driving circuit in the vibration driving apparatus comprises the one shown in FIG. 11. The driving start operation by a control microcomputer 11 as the characteristic feature of this embodiment will be described on the basis of the flow chart in FIG. 1 and the characteristic curve of a vibration motor driving algorithm representing the relationship between the frequency and rotation number, including the hysteresis characteristics shown in FIG. 2.

In this embodiment, the control microcomputer 11 has a memory (not shown) which can store a driving start frequency.

In the flow chart of FIG. 1, when the driving circuit is powered on, it is determined whether an initial frequency is stored in the memory (S01).

If no initial frequency is stored, a frequency $f_0$ much lower than the resonant frequency is set in step S02. An oscillator 2 oscillates at the frequency $f_0$, and a signal having the frequency $f_0$ is applied to the piezoelectric members of the electro-mechanical energy conversion element of the present invention as A and B phase driving signals.

It is determined on the basis of an output from an encoder 9 whether driving of the vibration motor has been started (S03). If N0 in step S03, the frequency is swept from the lower frequency $f_0$ to a higher frequency as a warm-up operation to detect the rotation number (S04). When it is determined that driving of the vibration motor has been started, for example, when the motor abruptly starts rotating at a frequency $f_1$ at high speed, this frequency (driving start frequency) $f_1$ or a slightly higher frequency obtained by adding α to the driving start frequency $f_1$ is stored in the memory (S05).

The motor is then stopped (S06), and the flow returns to step S01. In this case, the motor is temporarily stopped, but the driving start operation may be performed without stopping the motor.

If it is determined in step S01 that the initial frequency ($f_1$ or $f_1+α$) is stored in the memory, the motor is started (S07) by applying a periodic signal having the initial frequency stored in the memory to start a driving operation of the motor (S08). When the stop operation is then performed (S09), as needed, the motor is stopped.

In this embodiment, as shown in FIG. 2, the driving start frequency $f_1$ does not have a hysteresis area fw1 (the motor is immediately driven when the frequency is reduced from the higher frequency side to the lower frequency side; the motor is not immediately driven when the frequency is increased from the lower frequency side to the high frequency side) as indicated by a dotted line. The motor can therefore be immediately driven. In addition, the frequency $f_1$ provides the highest speed and is outside the hysteresis area fw1.

Fast driving start characteristics can be obtained by starting a driving operation of the motor at this frequency.

(Second Embodiment)

Figure 3:
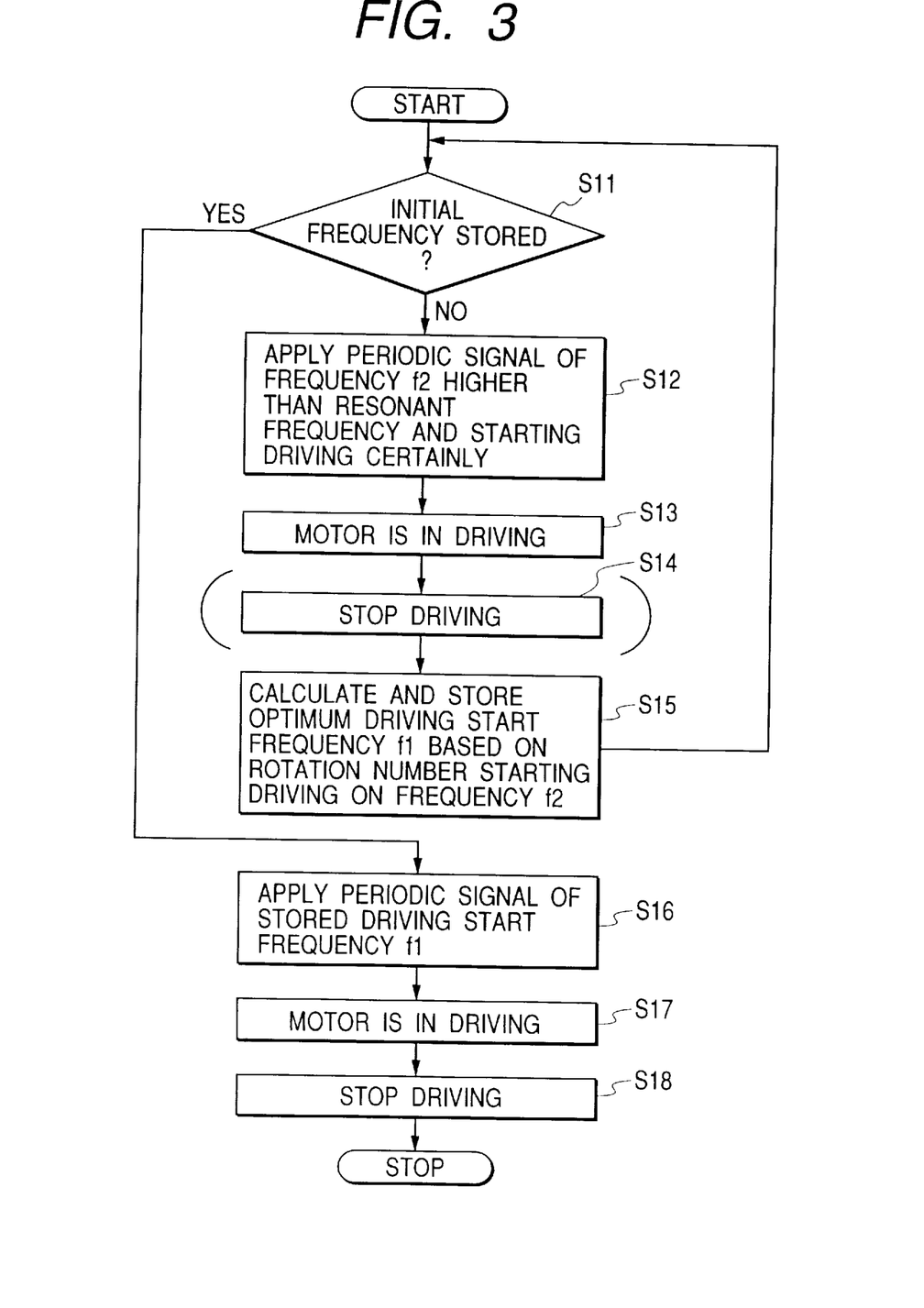
FIG. 3 is a flow chart showing the operation of the second embodiment of the present invention.
Figure 4:
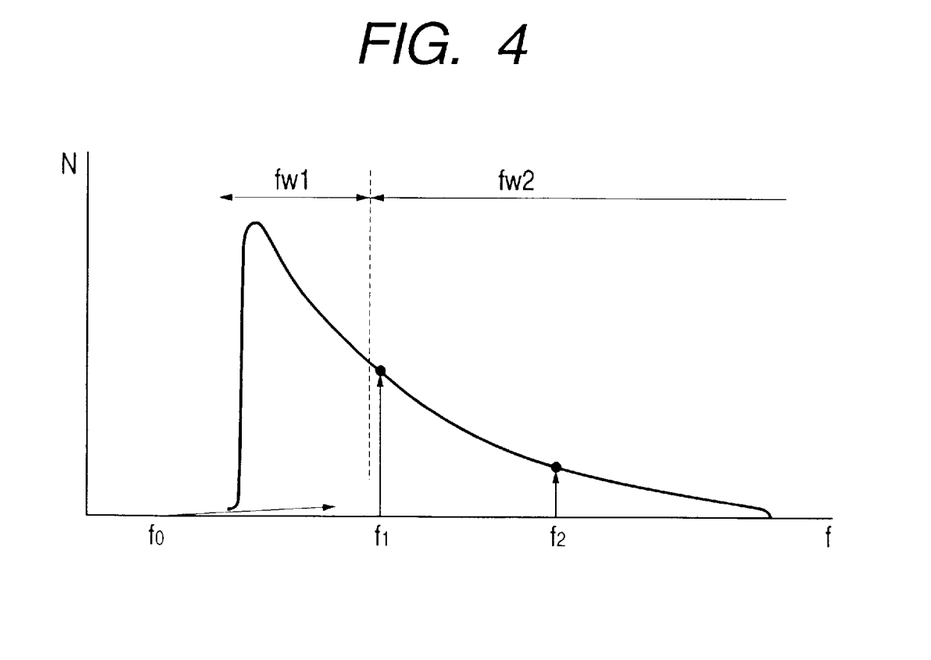
FIG. 4 is a graph showing the characteristics of a driving algorithm shown in FIG. 3 and representing the relationship between the frequency and rotation number including hysteresis characteristics.

FIGS. 3 and 4 show the second embodiment of the present invention.

A vibration motor in a vibration driving apparatus of this embodiment is not limited to a specific one. For example, the vibration motor comprises a rod type vibration motor shown in FIG. 10, and a vibration motor driving circuit in the vibration driving apparatus comprises the one shown in FIG. 11. The driving start operation by a control microcomputer 11 as the characteristic feature of this embodiment will be described on the basis of the flow chart in FIG. 3 and the characteristic curve of a vibration motor driving algorithm representing the relationship between the frequency and rotation number, including the hysteresis characteristics shown in FIG. 4.

In this embodiment, a table representing the relationship between the frequency and rotation speed of the motor is stored in a memory (not shown) of the control microcomputer 11. An initial frequency as an optimal driving start frequency is stored in the memory.

When the operation of the embodiment shown in FIG. 3 is started, it is determined whether an initial frequency is stored (S11). If N0 in step S11, an oscillator 2 is oscillated at a frequency $f_2$ much higher than that having the hysteresis area, i.e., higher than the resonant frequency to more reliably start driving the motor, and the motor is started by a driving signal having the above frequency (S12). Upon application of this frequency, the driving operation of the vibration motor is started (S13), and then stopped (S14). In this case, the motor is temporarily stopped, but the driving start operation may be performed without stopping the motor. The control microcomputer 11 detects the rotation speed (number) detected by a speed detector 9.

An optimal driving start frequency (fastest driving start frequency) in a non-hysteresis area fw2, excluding a hysteresis area fw1 is calculated by reference to the frequency/rotation number table stored in the memory, using the rotation speed at the frequency $f_2$. The calculated optimal driving start frequency is stored in the memory (S15), and the flow then returns to step S11.

The method of obtaining this frequency will be supplementarily explained. The table gives a relationship between a rotation number N2 at an optimal driving start frequency and the current rotation number (predetermined rotation number); it stores a frequency shift amount necessary to obtain an optimal driving start frequency from the current rotation number. If the current rotation number detected upon driving the motor at the frequency $f_2$ is represented by N1, a frequency shift amount necessary to obtain the optimal driving start frequency N2 from the current rotation number N1 is read out from the table. A frequency obtained by subtracting the readout shift amount from the frequency $f_2$ is calculated to yield the optimal driving start frequency $f_1$.

When it is determined in step S11 that an initial frequency is stored in the memory, the flow advances to step S16 to apply a periodic signal having the driving start frequency $f_1$ stored in the memory. The driving operation of the motor is started (S17), and then the motor is stopped, as needed (S18).

More specifically, the current position in the frequency vs. rotation characteristic curve can be determined from the table representing the relationship between the frequency and rotation number stored in the memory. The fastest rotation number outside the hysteresis area fw1 falls within a given value range though certain motor variations are present.

In subsequent driving operations, the control microcomputer 11 calculates the frequency corresponding to the fastest rotation number outside the hysteresis area with reference to the above result. The control microcomputer 11 applies a voltage having this frequency to the vibration motor.

The driving operation of the vibration motor can be started at the fastest rotation number outside the hysteresis area.

As described above, according to this embodiment, although the driving operation of the motor cannot be started at high speed for the first time, a fast driving start operation can be realized without warm-up operation as described in the first embodiment.

(Third Embodiment)

Figure 5:
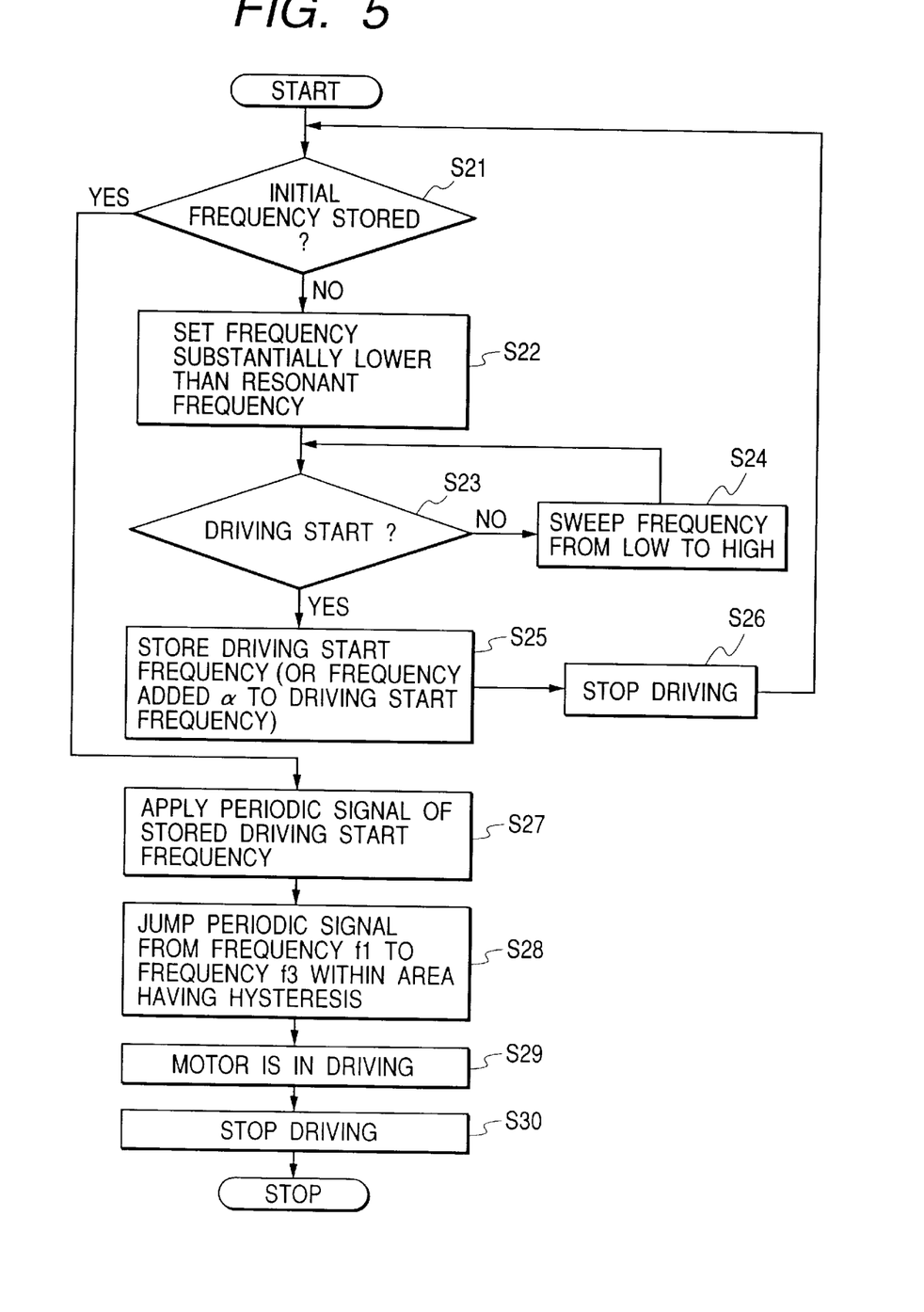
FIG. 5 is a flow chart showing the operation of the third embodiment of the present invention.
Figure 6:
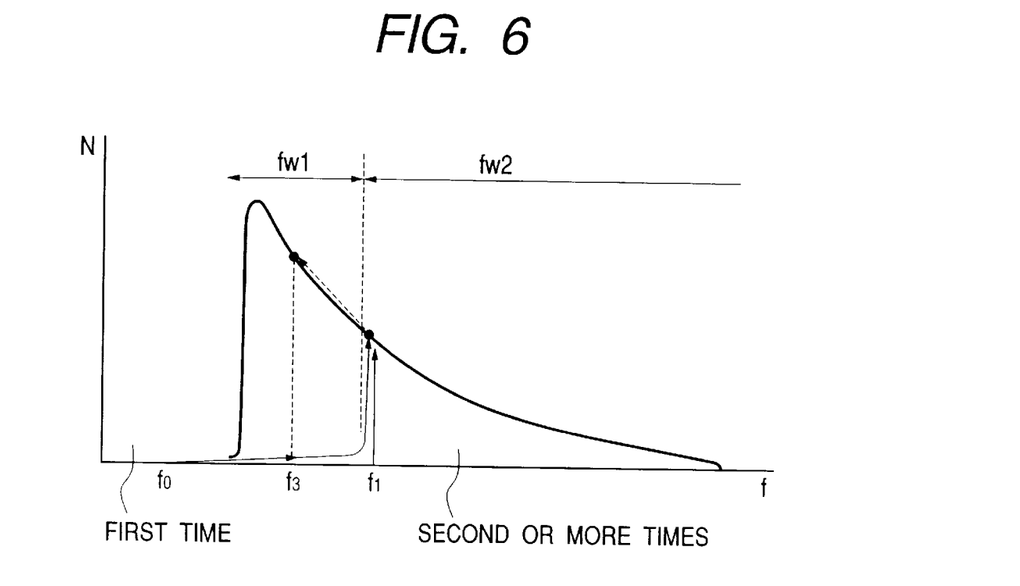
FIG. 6 is a graph showing the characteristics of a driving algorithm shown in FIG. 5 and representing the relationship between the frequency and rotation number including hysteresis characteristics.

FIGS. 5 and 6 show the third embodiment of the present invention.

A vibration motor in a vibration driving apparatus of this embodiment is not limited to a specific one. For example, the vibration motor comprises a rod type vibration motor shown in FIG. 10, and a vibration motor driving circuit in the vibration driving apparatus comprises the one shown in FIG. 11. The driving start operation by a control microcomputer 11 as the characteristic feature of this embodiment will be described on the basis of the flow chart in FIG. 5 and the characteristic curve of a vibration motor driving algorithm representing the relationship between the frequency and rotation number, including the hysteresis characteristics shown in FIG. 6.

In this embodiment, the control microcomputer 11 has a memory storing a driving start frequency as an initial frequency.

In the flow chart of FIG. 5, when the driving circuit is powered on, it is determined whether an initial frequency is stored in the memory (S21).

If no initial frequency is stored, a frequency $f_0$ much lower than the resonant frequency is set in step S22. A driving signal having the frequency $f_0$ is applied to the motor.

It is determined on the basis of an output from an encoder 9 whether driving of the vibration motor has started (S23). If N0 in step S23, the frequency is swept from the lower frequency $f_0$ to a higher frequency as warm-up operation to detect the rotation number (speed), i.e., whether the motor starts rotating (S24). When it is determined in step S23 that driving of the vibration motor has been started, for example, when the motor abruptly starts rotating at a frequency $f_1$ at high speed, this frequency (driving start frequency) $f_1$ or a slightly higher frequency obtained by adding $\alpha$ to the driving start frequency $f_1$ is stored in the memory (S25).

The motor is then stopped (S26), and the flow returns to step S21.

If it is determined in step S21 that the initial frequency ($f_1$ or $f_1+\alpha$) is stored in the memory, a periodic voltage having the initial frequency $f_1$ stored in the memory is applied to the motor to start driving it for steady driving (S27).

The voltage is kept applied to the motor at the initial frequency $f_1$ for a time the motor takes to rise (about several msec), and then the frequency is abruptly jumped to a frequency $f_3$ (e.g., a frequency corresponding to a target speed) in a hysteresis area fw1 (i.e., an abrupt shift from the frequency $f_1$ to the frequency $f_3$) (S28). The driving operation of the motor is then performed at the frequency $f_3$ (S29). Motor stop operation is performed, as needed (S30), and the motor is stopped.

In this embodiment, when the frequency is jumped to the frequency $f_3$, hysteresis is already gone, and driving is allowed in a high-speed area. In this embodiment, although the frequency is jumped to the frequency $f_3$, a driving operation of the motor may be started at the frequency $f_1$, and then the frequency may be gradually reduced.

(Fourth Embodiment)

Figure 7:
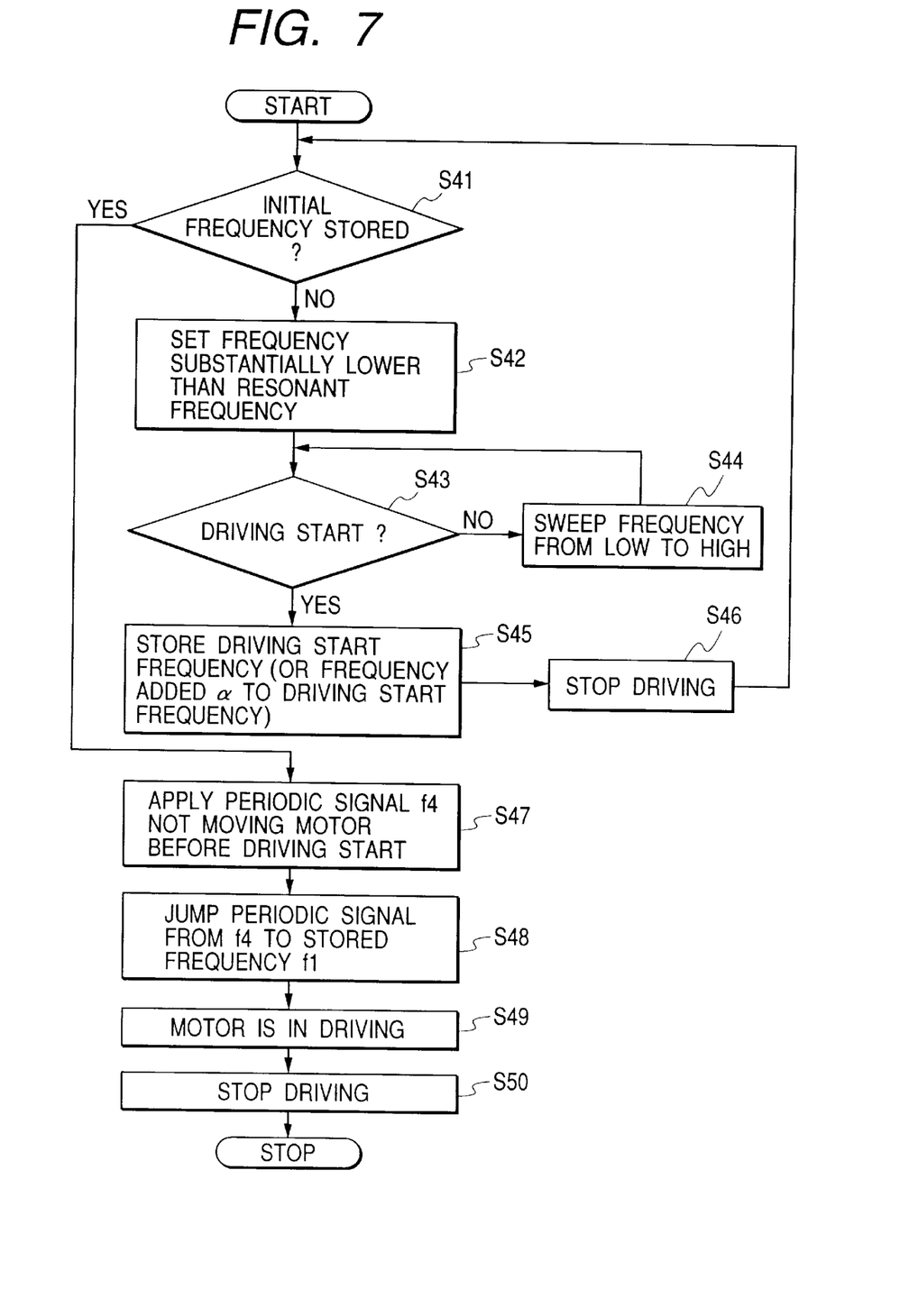
FIG. 7 is a flow chart showing the operation of the fourth embodiment of the present invention.
Figure 8:
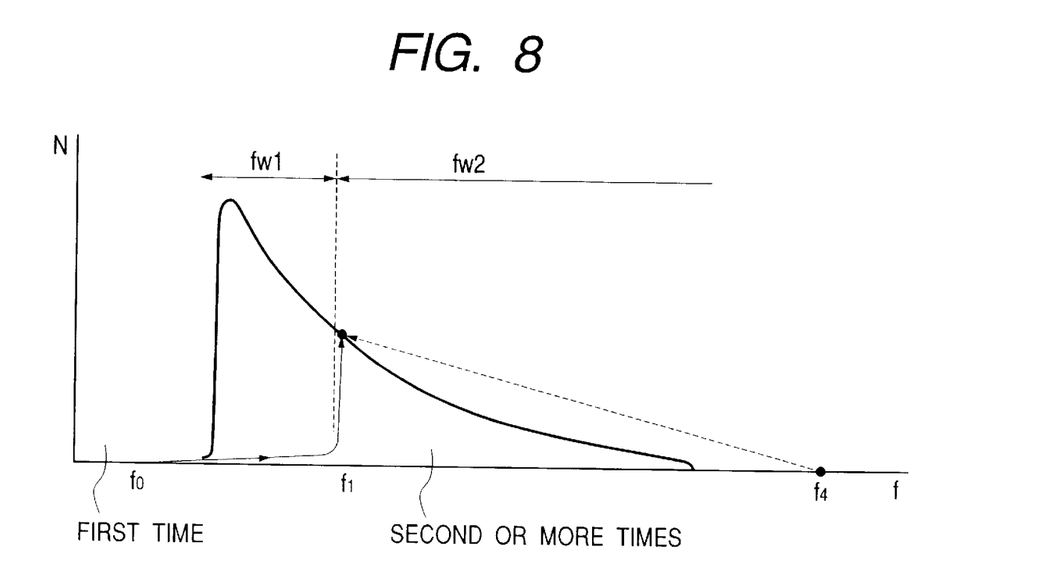
FIG. 8 is a graph showing the characteristics of a driving algorithm shown in FIG. 7 and representing the relationship between the frequency and rotation number including hysteresis characteristics.

FIGS. 7 and 8 show the fourth embodiment of the present invention.

A vibration motor in a vibration driving apparatus of this embodiment is not limited to a specific one. For example, the vibration motor comprises a rod type vibration motor shown in FIG. 10, and a vibration motor driving circuit in the vibration driving apparatus comprises the one shown in FIG. 11. The driving start operation by a control microcomputer 11 as the characteristic feature of this embodiment will be described on the basis of the flow chart in FIG. 7 and the characteristic curve of a vibration motor driving algorithm representing the relationship between the frequency and rotation number (speed), including the hysteresis characteristics shown in FIG. 8.

In this embodiment, the control microcomputer 11 has a memory storing a driving start frequency as an initial frequency.

In the flow chart of FIG. 7, when the driving circuit is powered on, it is determined whether an initial frequency is stored in the memory (S41).

If no initial frequency is stored, a frequency $f_0$ much lower than the resonant frequency is set in step S42.

It is determined whether driving of the vibration motor has been started (S43). If N0 in step S43, the frequency is swept from the lower frequency $f_0$ to a higher frequency as a warm-up operation to detect the rotation number (speed) (S44). When it is determined in step S43 that driving of the vibration motor has been started, for example, when the motor abruptly starts rotating at a frequency $f_1$ at high speed, this frequency (driving start frequency) $f_1$ or a slightly higher frequency obtained by adding $\alpha$ to the driving start frequency $f_1$ is stored in the memory (S45).

The motor is then stopped (S46), and the flow returns to step S41.

If it is determined in step S41 that the initial frequency ($f_1$ or $f_1+\alpha$) is stored in the memory, a periodic signal having a high frequency $f_4$ to keep the vibration motor stopped is applied to the vibration motor (S47). Note that the frequency $f_4$ is obtained by checking the motor characteristics in advance.

The frequency then is jumped to the initial frequency $f_1$ stored in the memory and representing the fastest rotation number outside the hysteresis area fw1, and a periodic signal having the frequency $f_1$ is applied to the motor (S48). A driving operation of the motor is started at the frequency $f_1$ (S49), and the motor stop operation is performed, as needed (S50). The motor is then stopped.

When the voltage is kept applied to the motor prior to its start operation, no time is required to charge the piezoelectric element. Therefore, the rise time can be shortened as compared with the case in which a driving operation of the motor is started simply by applying a periodic signal having the frequency $f_1$.

In addition, since vibration tends to occur, the hysteresis area can be narrowed as compared with the case in which the voltage having the frequency $f_1$ is abruptly applied to the motor. Therefore, the driving start frequency can be immediately shifted to a frequency which allows higher-speed rotation.

Figure 9:
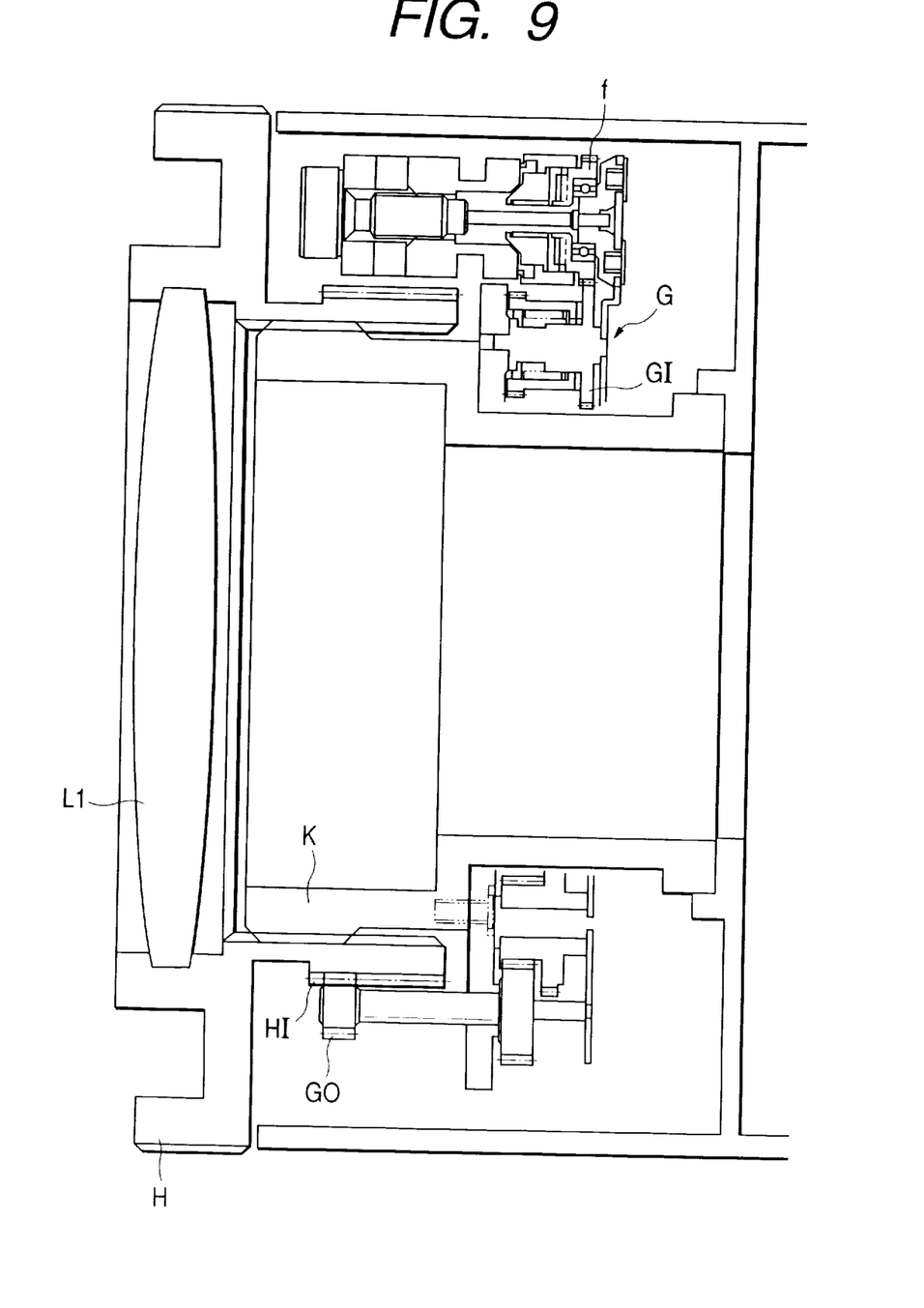
FIG. 9 is a view showing the arrangement when the apparatus of the present invention is applied to a lens apparatus.

FIG. 9 is a view showing the arrangement in which a motor driven by each embodiment described above is applied as a lens driving source.

A driven system as a vibration driving apparatus in FIG. 9 serves as a lens driving system in a lens barrel. A gear f driven together with a vibration motor meshes with an input gear GI of a gear transmission mechanism G. An output gear GO of the gear transmission mechanism G meshes with a gear HI formed on a lens holding member H which holds a lens L1. The lens holding member H is helicoid-coupled to a stationary cylinder K, and focusing is performed by rotation through the gear transmission mechanism G using the driving force of the vibration motor.

What is claimed is:

1. A driving apparatus for a vibration motor, and which causes the vibration motor to generate a driving force by applying a periodic signal to an electro-mechanical energy conversion element of the vibration motor, said driving apparatus comprising:

a driving circuit for applying a periodic signal to the electro-mechanical energy conversion element; and a setting circuit for setting, as an initial frequency of the periodic signal to be applied to the electro-mechanical energy conversion element when a driving operation of the vibration motor is started, a frequency corresponding to a boundary frequency at which the vibration motor starts to generate a driving force when the frequency of the periodic signal applied to the electro-mechanical energy conversion element is changed from a frequency lower than a resonant frequency to a frequency higher than the resonant frequency.

2. A driving apparatus according to claim 1, wherein said driving circuit starts a driving operation of the vibration motor by applying to the electro-mechanical energy conversion element a periodic signal having the initial frequency and then jumps the frequency of the periodic signal applied to the electro-mechanical energy conversion element from the initial frequency to a predetermined frequency lower than the initial frequency.

3. A driving apparatus according to claim 1, wherein said driving circuit starts a driving operation of the vibration motor by applying to the electro-mechanical energy conversion element a periodic signal having the initial frequency and then controls the frequency of the periodic signal applied to the electro-mechanical energy conversion element so as to remain in a frequency range lower than the initial frequency.

4. A driving apparatus according to claim 1, wherein said driving circuit applies to the electro-mechanical energy conversion element a periodic signal having a high frequency incapable of causing the vibration motor to generate a driving force before applying to the electro-mechanical energy conversion element a periodic signal having the initial frequency, and then jumps the frequency of the periodic signal from the high frequency to the initial frequency.

5. A driving apparatus according to claim 1, wherein said driving apparatus is operable in a frequency changing mode, in which said driving circuit changes the frequency of the periodic signal from a low frequency to a high frequency, and wherein said driving apparatus further comprises:

drive determination means for determining whether the vibration motor starts to generate a driving force during a time in which said driving circuit changes the frequency of the periodic signal when said driving circuit is in the frequency changing mode; and initial frequency determining means for determining the initial frequency on the basis of a frequency of the periodic signal applied to the electro-mechanical energy conversion element when said determination means determines that the vibration motor has started to generate a driving force in the frequency changing mode.

6. A driving apparatus according to claim 1, wherein the frequency corresponding to the boundary frequency is determined by sweeping the frequency of the periodic signal applied to the electro-mechanical energy conversion element from a frequency lower than the resonant frequency to a frequency higher than the resonant frequency.

7. A driving apparatus for a vibration motor, and which causes the vibration motor to generate a driving force by applying a periodic signal to an electro-mechanical energy conversion element of the vibration motor, said driving apparatus comprising:

a driving circuit for applying a periodic signal to the electro-mechanical energy conversion element; and a control circuit for detecting a frequency corresponding to a boundary frequency at which the vibration motor starts to generate a driving force when the frequency of the periodic signal applied to the electro-mechanical energy conversion element of the vibration motor is changed from a frequency lower than a resonant frequency to a frequency higher than the resonant frequency, and for setting a frequency detected by said control circuit as a frequency of the periodic signal for driving the vibration motor.

8. A driving apparatus according to claim 7, wherein said control circuit controls said driving circuit so as to set the frequency detected by said control circuit as an initial frequency of the periodic signal for driving the vibration motor.

9. A driving apparatus according to claim 7, wherein the frequency corresponding to the boundary frequency is determined by sweeping the frequency of the periodic signal applied to the electro-mechanical energy conversion element from a frequency lower than the resonant frequency to a frequency higher than the resonant frequency.

10. A driving apparatus for a vibration motor, and which causes the vibration motor to generate a driving force by applying a periodic signal to an electro-mechanical energy conversion element of the vibration motor, said driving apparatus comprising:

a driving circuit for applying a periodic signal to the electro-mechanical energy conversion element;

a setting circuit for setting, as an initial frequency, a frequency higher than a frequency corresponding to a boundary frequency at which the vibration motor starts to generate a driving force at a time in which the frequency of a periodic signal applied to the electro-mechanical energy conversion element is changed from a frequency lower than a resonant frequency to a frequency higher than the resonant frequency; and a control circuit for controlling said driving circuit so as to change the frequency of the periodic signal applied to the electro-mechanical energy conversion element from the initial frequency set by said setting circuit to a frequency corresponding to the boundary frequency.

11. A driving apparatus according to claim 10, wherein the frequency corresponding to the boundary frequency is determined by sweeping the frequency of the periodic signal applied to the electro-mechanical energy conversion element from a frequency lower than the resonant frequency to a frequency higher than the resonant frequency.

12. A driving apparatus for a vibration motor, and which causes the vibration motor to generate a driving force by applying a periodic signal to an electro-mechanical energy conversion element of the vibration motor, said driving apparatus comprising:

a driving circuit for applying a periodic signal to the electro-mechanical energy conversion element; and a frequency control circuit including 1) a setting circuit for setting a frequency of the periodic signal of said driving circuit as an initial frequency for starting a driving operation of the vibration motor, the initial frequency being higher than a frequency that will drive the vibration motor, and 2) a jumping circuit for jumping the frequency of the periodic signal applied to the electro-mechanical energy conversion element from the frequency set by said setting circuit to a predetermined frequency, the predetermined frequency corresponding to a boundary frequency at which the vibration motor starts a driving movement when the frequency of the periodic signal applied to the electro-mechanical energy conversion element is changed from a frequency lower than a resonant frequency to a frequency higher than the resonant frequency.

13. A driving apparatus according to claim 12, wherein the frequency corresponding to the boundary frequency is determined by sweeping the frequency of the periodic signal applied to the electro-mechanical energy conversion element from a frequency lower than the resonant frequency to a frequency higher than the resonant frequency.

14. A driving apparatus for a vibration motor, and which causes the vibration motor to generate a driving force by applying a periodic signal to an electro-mechanical energy conversion element of the vibration motor, said driving apparatus comprising:

- a driving circuit for applying a periodic signal to the electro-mechanical energy conversion element;
- detection means for detecting a driving state of the vibration motor when the vibration motor is driven by said driving circuit applying a periodic signal having a predetermined frequency;
- calculation means for calculating, on the basis of the detected driving state, a frequency corresponding to a boundary frequency at which the vibration motor starts to generate a driving force during a time in which a frequency of the periodic signal applied to the electro-mechanical energy conversion element is changed from a frequency lower than a resonant frequency to a frequency higher than the resonant frequency; and
- a control circuit for jumping the frequency of the periodic signal from the predetermined frequency to the frequency calculated by said calculation means.

15. A driving apparatus according to claim 14, wherein the frequency corresponding to the boundary frequency is determined by sweeping the frequency of the periodic signal applied to the electro-mechanical energy conversion element from a frequency lower than the resonant frequency to a frequency higher than the resonant frequency.

* * * * *

UNITED STATES PATENT AND TRADEMARK OFFICE
CERTIFICATE OF CORRECTION

PATENT NO. : 6,107,720
DATED : August 22, 2000
INVENTOR(S) : AKIO ATSUTA

It is certified that error appears in the above-identified patent and that said Letters Patent is hereby corrected as shown below:

Column 3

Line 34, "frequency" should read --frequency so formed by the frequency control circuit--.

Signed and Sealed this

Twenty-ninth Day of May, 2001

Attest:

NICHOLAS P. GODICI

Attesting Officer  Acting Director of the United States Patent and Trademark Office